April 27, 1943.　　H. W. ALTORFER　　2,317,575
ADJUSTABLE PRESSURE WRINGER
Filed Nov. 17, 1938　　7 Sheets-Sheet 1

INVENTOR.
Henry W. Altorfer
BY Tefft & Tefft
ATTYS.

April 27, 1943.  H. W. ALTORFER  2,317,575
ADJUSTABLE PRESSURE WRINGER
Filed Nov. 17, 1938   7 Sheets-Sheet 3

INVENTOR.
Henry W. Altorfer
BY Tefft & Tefft
ATTYS.

Patented Apr. 27, 1943

2,317,575

UNITED STATES PATENT OFFICE 2,317,575

ADJUSTABLE PRESSURE WRINGER

Henry W. Altorfer, Peoria, Ill.

Application November 17, 1938, Serial No. 240,884

6 Claims. (Cl. 68—263)

This invention relates to clothes wringers of the type used on domestic washing machines. The general structure is conventional and will not be discussed in great detail.

Most domestic clothes wringers have pressure adjusting mechanism, but this mechanism is usually slow and cumbersome and does not show the operator the extent of the pressure on the rolls. It is quite desirable to have the roll pressure adjusted for the kind and thickness of the garments to be wrung, and although women operators recognize and desire this, the means for accomplishing this result is not convenient. Also when a wringer is set and in operation, the extent of the pressure on the rolls is not easily discernible and oftentimes an operator will attempt to wring thick garments with too heavy a pressure or even if the operator does know that the pressure is too heavy, the means for adjusting the pressure is not convenient, with the result that the operator will not take the time or trouble to adjust the pressure.

The particular object of this invention is to provide means whereby the rolls may be quickly and conveniently set at variable pressures to accommodate various kinds and thicknesses of garments.

Another object is to provide means whereby the roll pressure as set is easily and quickly discernible by the operator.

A still further object is to provide in conjunction with the above objects safe and convenient means whereby such variable roll pressures may be applied and released.

Other objects and benefits will be disclosed by the following descriptions and illustrations in which.

Figure 1:
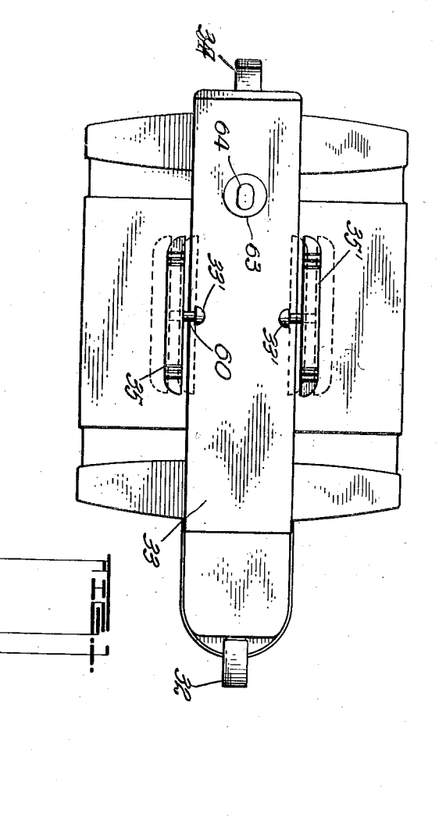
Fig. 1 is a plan view of my wringer complete, showing various release lever positions in dotted outline.
Figure 2:
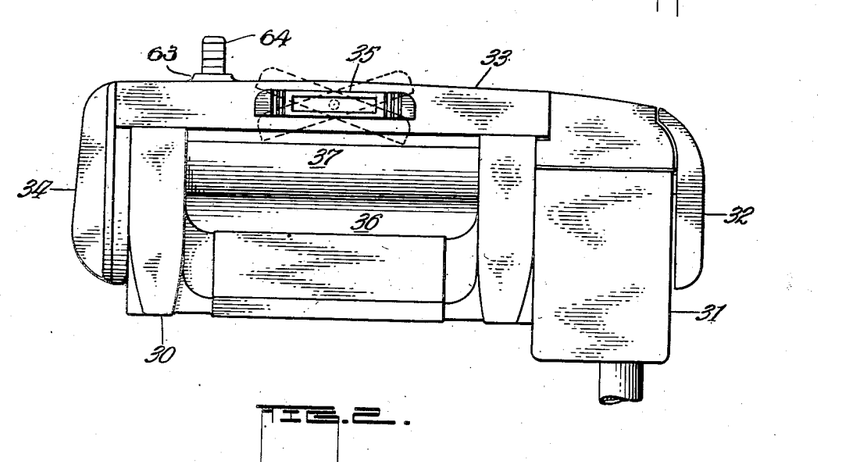
Fig. 2 is a front elevational view of the wringer complete, showing various release lever positions in dotted outline.

Now referring to Figs. 1 and 2. The numeral 30 designates a lower frame with conventional drain boards. Attached to the lower frame is the reversible gear head 31 controlled by handle 32 which drives the lower roll 36 and the upper roll 37 either forward or in reverse direction or stops the rolls when in neutral position. The numeral 33 designates the top frame and the numeral 34 the roll pressure reset lever. The pressure release levers 35 and 35' as shown in Fig. 1, both in solid and in dotted outline, release the roll pressure by lateral movement as indicated in Fig. 1 and also by pivotal movement as shown in Fig. 2. These movements and the resultant release action of these movements will later be described in detail.

Figures 3, 4:
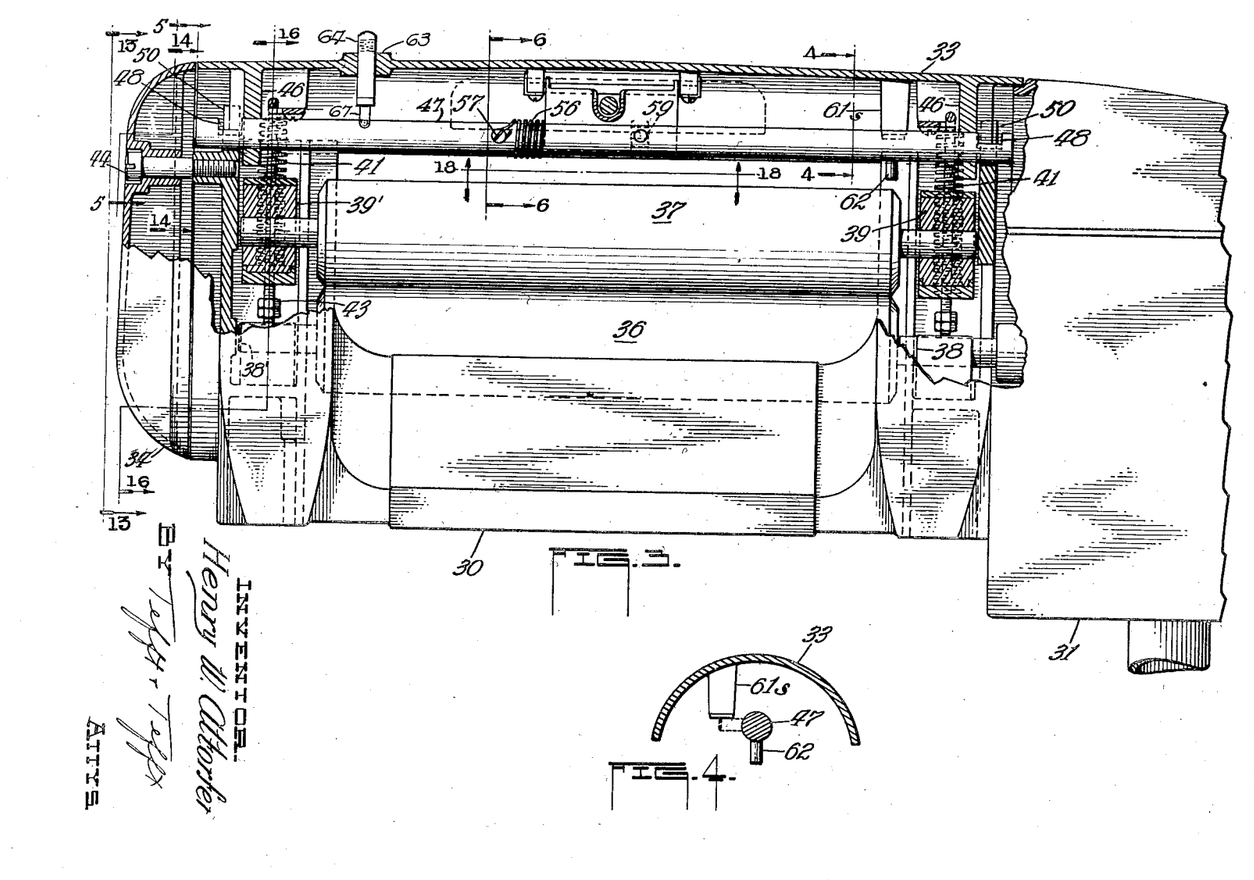
Fig. 3 is an enlarged broken elevation view partly in section to show general details of the operating mechanism.
Fig. 4 is a sectional view on the line 4—4 of Fig. 3, showing dual positions of a stop mechanism.
Figures 13, 14, 15, 16, 17:
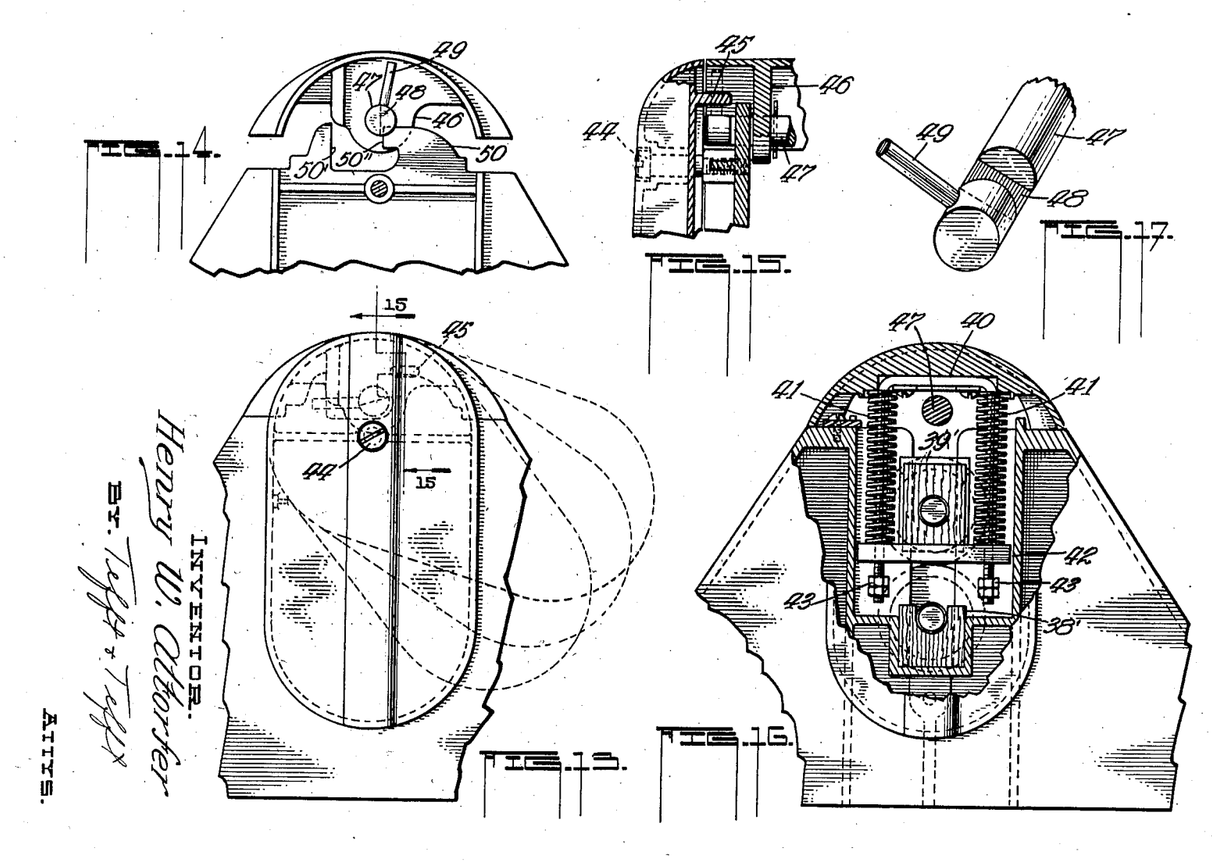
Fig. 13 is a broken end view showing the pressure applying handle in normal position in solid outline, then its position for low, medium and high in dotted outline.
Fig. 14 is a broken end elevation view on the section line 14—14 of Fig. 3 with various parts removed to show the relation of the lower and top frames and pressure applying mechanism as the top frame is placed on the lower frame.
Fig. 15 is a broken elevational view of the upper left hand corner of the wringer to disclose certain relations of parts later to be described.
Fig. 16 is a broken end view on the section lines 16—16 of Fig. 3, showing the mechanism for mounting the wringer rolls.
Fig. 17 is a broken isometric end view of the pressure cam bar with the lever pin in position.

Now referring to Fig. 3. It will be noted that the lower roll is mounted in bearings 38 and 38' supported in the main frame 30 and that the upper roll is mounted in bearings 39 and 39' supported by a U-bolt and spring structure from the top frame 33. An end view which shows this structure very clearly is shown in Fig. 16, and inasmuch as both end structures are identical, only one end will be described. The U-bolt 40 is bolted in a recess of the upper frame 33 and supports the bearing 39' in a cross bar member 42 slidably mounted on the U-bolt 40 and retained by the dual lock nuts 43. Compression springs 41 surrounding the vertical members of the U-bolt 40 urge the cross bar member 42 supporting the bearing 39' and the upper roll 37 downward for pressure contact with the lower roll 36.

Now again referring to Fig. 3. It will be noted that the pressure reset handle 34 is pivotally mounted on the lower frame 30 by the shoulder screw 44. Integral with the pressure reset lever 34 is a boss 45, as shown in Figs. 5, 7, 9, 11, 13 and 15, for actuating the pressure reset mechanism. It will be appreciated that by pivotal movement of the reset lever 34, the boss 45 contacts the cam bar pin 49 to rotate the cam bar for applying roll pressure.

Integral with the lower frame 30 are dual upwardly projecting lugs 50 having a vertical guide face 50' and a projecting cam lug 50'' for co-action with the cam 48 in the cam bar 47 and the lugs 46 of the top frame 33 for guiding the top frame 33 and forcing the top roll 37 into pressure relationship with the lower roll 36. Figs. 5, 7, 9 and 11 show the progressive steps of this pressure applying mechanism. Fig. 14 very clearly shows the relationship of the lug 50 and the vertical guide face 50' on the lower frame with the lug 46, the cam bar 47 and the cam opening 48 on the top frame as the top frame is about to be set on the lower frame.

Figures 5, 8:
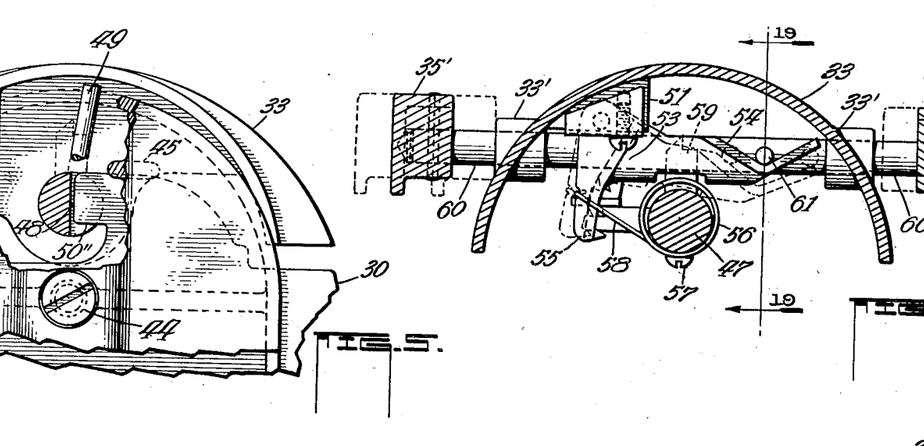
Fig. 5 is an enlarged broken end view on the section lines 5—5 of Fig. 3 with parts broken away to show a certain cycle relation of a pressure application mechanism.
Fig. 8 is a similar view to Fig. 6, showing the pressure set and release mechanism in position corresponding to the mechanism as shown in Fig. 7.
Figures 6, 7:
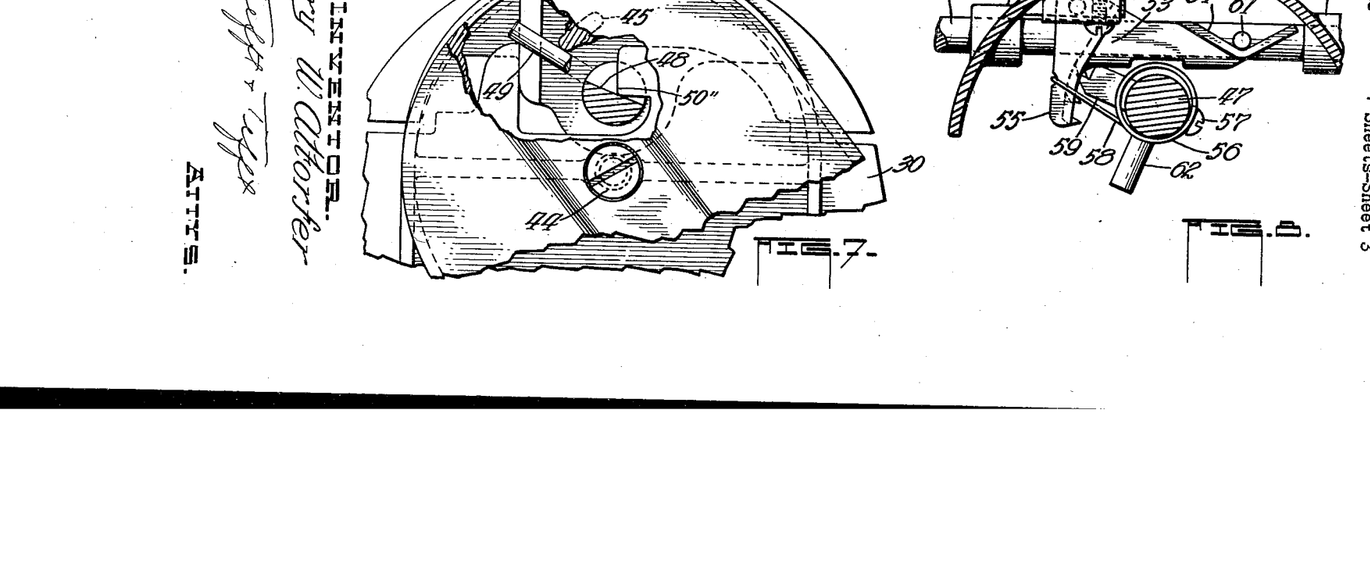
Fig. 6 is an enlarged sectional elevation view of the variable pressure set and release mechanism on the section line 6—6 of Fig. 3.
Fig. 7 is a similar view to Fig. 5, showing an advance cycle of the pressure applying mechanism.
Figure 9:
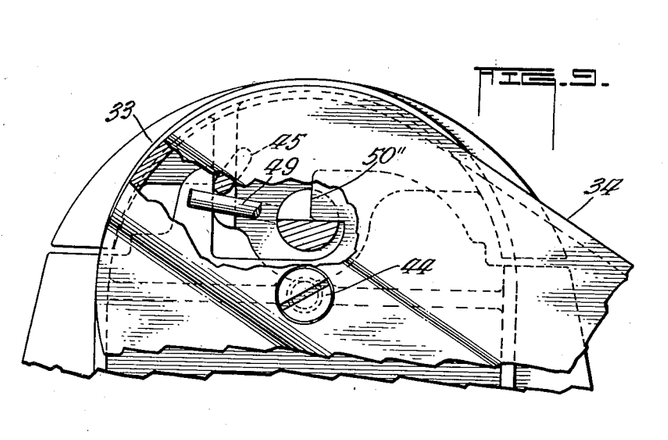
Fig. 9 is another similar view to Figs. 5 and 7, showing a still further advance position of the pressure application mechanism, namely the medium pressure position.
Figure 10:
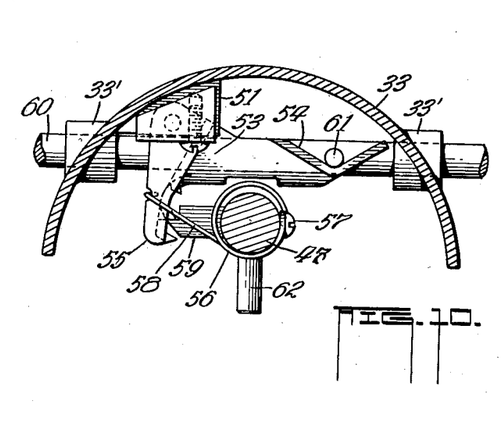
Fig. 10 is another view similar to Figs. 6 and 8, showing the pressure set and release mechanism in medium position.
Figures 11, 12:
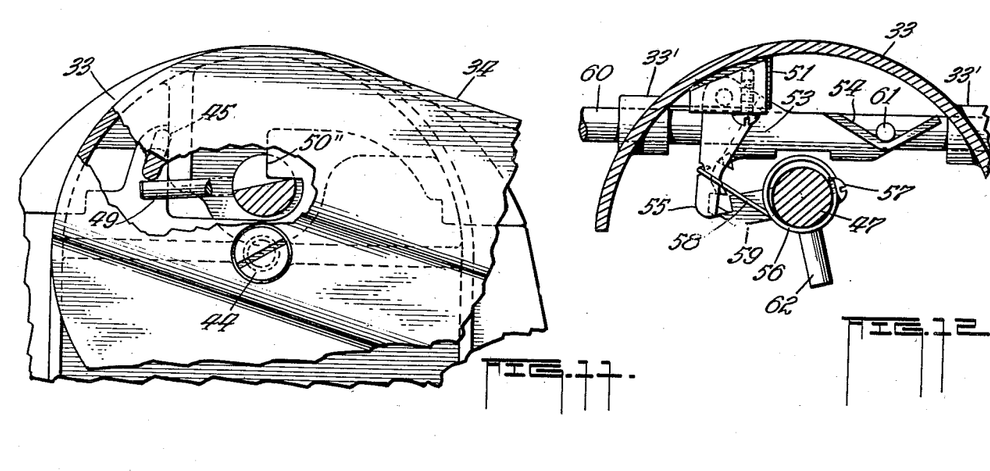
Fig. 11 is another view similar to Figs. 5, 7 and 9, showing the high position of the pressure applying mechanism.
Fig. 12 is another view similar to Figs. 6, 8 and 10, showing the high position of the pressure set and release mechanism.
Figures 18, 19, 20:
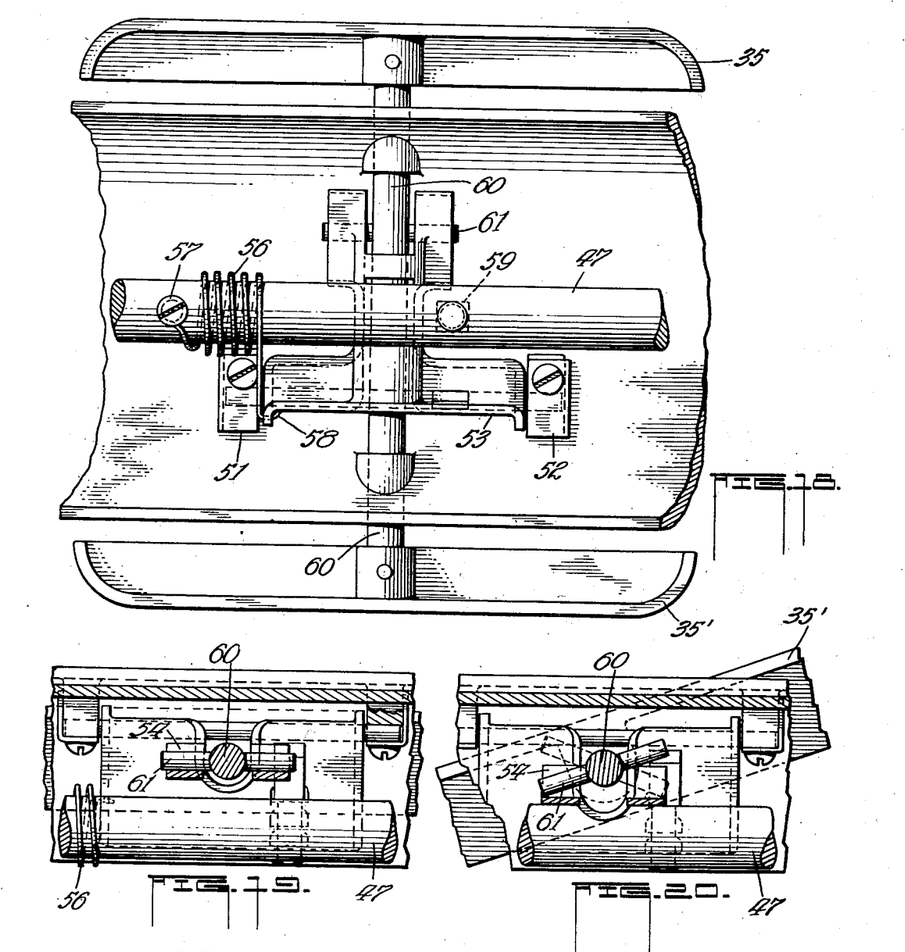
Fig. 18 is an enlarged plan view of the pressure release mechanism as it appears from the section line 18—18 of Fig. 3.
Fig. 19 is a broken sectional elevation view of the same release mechanism as appears in Fig. 18 with the parts in normal position.
Fig. 20 is a similar view to Fig. 19 showing the changed relation of the parts by manual operation of the pressure release lever which will later be described.

Now referring to Figs. 6 and 18. Dual bearing bosses 51 and 52 attached to the top frame 33 pivotally support the release latch 53 which has a dual inclined cam surface 54 and a toothed arm 55 integral with it. Surrounding the cam bar 47 is a torsion spring 56 attached to the bar 47 by a screw 57. On the opposite end of the torsion spring 56 is a hooked extension 58 hooked around a notch in the toothed arm 55 urging the latch 53 counter-clockwise as shown in Fig. 6 so that the cam surface 54 is held against the pin 61 in the cross bar 60. It will be apparent that by this torsional action of the spring 56 the cam bar 47 will be urged in a clockwise direction as shown in Figs. 5 to 12, inclusive. Fixed to the cam bar 47 is a toothed dog 59 positioned for co-action with the teeth on the arm 55 by progressive rotation of the cam bar 47 as shown progressively in Figs. 6, 8, 10 and 12. The three toothed positions as shown in Figs. 8, 10 and 12 are the low, medium and high pressure positions, as will later be described.

Figure 21:
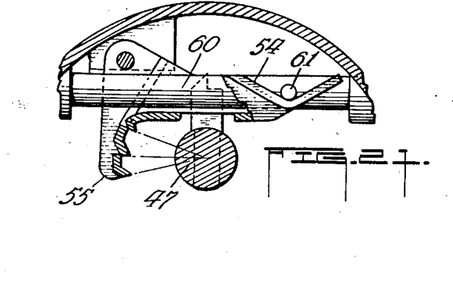
Fig. 21 is a sectional end view of the same pressure release mechanism as shown in Figs. 18, 19 and 20.

In the top frame 33 are dual bosses 33' slidably and pivotally supporting a transverse bar 60 with a cross pin 61 engaging the cam surfaces 54 of the latch member 53. On each end of the bar 60 are attached release levers 35 and 35'. These levers, as will be appreciated, are mounted for both transverse and pivotal movement, as shown in Figs. 1 and 2. It will readily be understood that transverse movement will slide the pin 61 on the cam surfaces 54 and rotate the latch 53 in a clockwise direction, thus releasing the toothed dog 59 from the teeth in the arm 55 and permitting the cam bar 47 to rotate clockwise, thus releasing the roll pressure. This clockwise rotation of the cam bar 47 is stopped at the proper point by a boss 61S in the top frame 33, which contacts a stop pin 62 in the cam bar 47. This is well illustrated in Fig. 4 where the pin 62 in dotted outline is shown in stopped position against the boss 61S. This stopped position puts the cam bar 47 in proper relation for camming action, as shown in Figs. 5 and 14. In Figs. 19, 20 and 21 the pivotal movement of the release lever 35 is well illustrated.

Figures 22, 23:
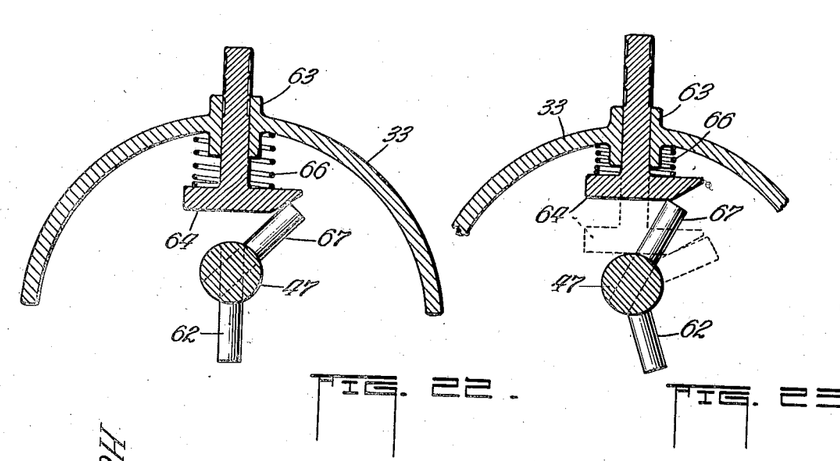
Fig. 22 is a sectional end view of a roll pressure indicating mechanism at the medium cycle of operation, which will later be described.
Fig. 23 is a similar view to Fig. 22 with the roll pressure indicating mechanism in high position.
Figure 24:
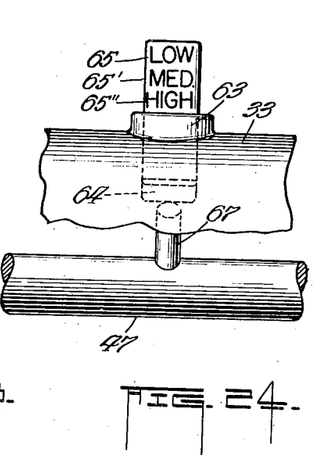
Fig. 24 is a broken side view of the roll pressure indicating mechanism as shown in Fig. 23.

Now referring to Figs. 22, 23 and 24, I illustrate a pressure indicating device which can be applied at various places on the top bar 33. As illustrated in Figs. 8, 10 and 12, the cam bar 47 is rotated to three positions for low, medium and high roll pressures. In Figs. 22, 23 and 24 I show a vertical boss 63 slidably mounting an indicator member 64. This member 64 is marked on its upper end with the roll pressure markings 65, 65' and 65'' for low, medium and high pressure. A compression spring 66 between the top frame 33 and the indicating member 64 urges the indicating member downward. In position to co-act with the member 64 pin 67 is fixed in the cam bar 47. As shown in Fig. 22 the pin 67 has contacted the indicator member 64 and is holding it in medium position. In Figs. 23 and 24 the pin 67 is holding the indicator at high. In Fig. 23 in dotted outline the indicator is shown at low.

Figure 25:
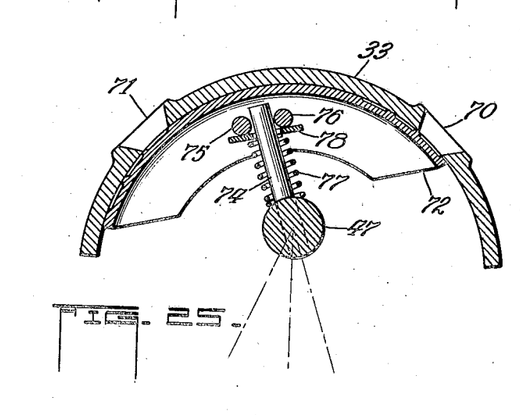
Fig. 25 is another design of a roll indicating mechanism shown in transverse section.
Figure 26:
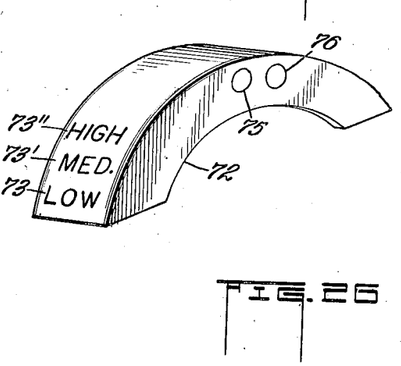
Fig. 26 is an isometric view of the radial indicator plate of the mechanism shown in Fig. 25.

In Fig. 25 I illustrate another pressure indicating mechanism. In the upper frame 33 are open windows 70 and 71. A segmental indicator 72 is mounted inside the frame 33 for oscillatory movement from the cam bar 47. This is accomplished by pin 74 in the cam bar projecting upward and between the pins 75 and 76 in the indicator, the indicator being held upward by a compression spring 77 and the washer 78. The indicator markings as shown in Fig. 26 for low, medium and high, numerals 73, 73' and 73'' will appear in the window 71. Obviously the markings will be reversed on the opposite end to appear in the window 70. As before noted, this is an optional structure having some advantages over the structure as shown in Figs. 22, 23 and 24.

Operation

Having thus described my structure and mechanism, I will now explain its operation.

Assuming the wringer is in actual operation, instant pressure release may be effected by any transverse or pivotal movement of the release levers 35 and 35' as shown in Figs. 1 and 2. This is accomplished by release of the latch 53 by clockwise pivotal movement accomplished by contact of the pin 61 on the cam surface 54 which releases the cam bar for rotation clockwise and out of engagement with stationary cam lug 50". It will be appreciated that the cam bar 47 is urged toward clockwise rotation both by the spring 56 and the unstable relationship of the cam surface 48 and the stationary cam lug 50".

Now with the rolls released from pressure relationship as above described, reset of the roll pressure is accomplished by setting the top frame with the upper roll on the lower frame, as shown in Fig. 14. The cam surface 48 is positioned in proper relationship with the stationary cam lug 50" because that relationship has been established by the stop 60 and pin 62.

With the frame and parts as shown in Fig. 5, pressure may be reset by pivoting the handle 34 which rotates the cam bar 47 by contact of the boss 45 on the pin 49, thus camming the top frame and roll downward by co-action of the cam surface 48 on the stationary cam lug 50".

When this pivotal movement is stopped in the position shown in Fig. 7, the cam bar 47 is retained in low pressure position by the toothed dog 59 retained behind the first tooth of the arm 55. Slightly further rotation of the reset lever 34 as shown in Fig. 9 puts the toothed dog 59 behind the second tooth of the arm 55 and the rolls are thus held in medium pressure relationship. Similarly, additional pivotal movement of the arm 34, as shown in Fig. 11, puts the toothed dog behind the third tooth and the rolls are thus held in high pressure relationship. It will readily be appreciated how this increased pressure is accomplished by comparison of the relationship of the top frame 33 with the lower frame 30 and the progressive rotational movement of the cam surface 48 as well illustrated in Figs. 5, 7, 9 and 11.

It will thus be understood that low, medium and high roll pressures are accomplished by progressive stepped rotation of the cam bar 47. This movement of the cam bar provides ready means for actuating a roll pressure indicator and two such devices are illustrated. The one in Figs. 22, 23 and 24 is a vertically moving indicator as will be easily understood by reference to the above illustrations. The other pressure indicator is an open window type wherein the indicator is oscillated by the cam bar to show the various roll pressures.

Now should the operator be about to wring a heavy wool blanket and the wringer was set on high pressure as illustrated in Fig. 24, she could at a glance see that the wringer was set at high pressure and desiring to use low pressure could release the spring pressure by touching the release lever 35 and reset to low pressure by pivotal movement of the lever 34.

With this explanation of the operation of my wringer, it will readily be appreciated that I have provided means whereby the operator may observe the roll pressure setting at a glance and quickly and conveniently reset the roll pressure to properly accommodate the wringing of various kinds and thicknesses of garments. The present invention comprises an improvement on the wringer disclosed in Patent No. 2,181,255.

Having thus described the invention, I claim:

1. In a wringer, a lower frame, a lower roll mounted in the lower frame, an upper frame, an upper roll resiliently mounted to the upper frame to urge the roll downward into pressure relationship with the lower roll, a cam bar rotatably mounted in the upper frame, hook members for said cam bar, cam and lever mechanism on the lower frame to actuate the cam bar for downward camming movement of the upper frame, and releasable means to fix the cam bar at various points of its movement whereby variable roll pressure may be set at the option of the operator.

2. In a wringer, a lower frame, a lower roll mounted in the lower frame, an upper frame, an upper roll resiliently mounted to the upper frame to urge the roll downward into pressure relationship with the lower roll, a cam bar rotatably mounted in the upper frame, hook members for said cam bar, cam and lever mechanism on the lower frame to actuate the cam bar for downward camming movement of the upper frame, means to fix the cam bar at various points of its movement whereby variable roll pressure may be set at the option of the operator, and means to release said cam bar for reverse movement and release of roll pressure.

3. In a wringer, a lower frame, a lower roll mounted in the lower frame, an upper frame, an upper roll resiliently mounted to the upper frame to urge the roll downward into pressure relationship with the lower roll, an unstable rotatable cam bar mounted in the upper frame, hook members on the lower frame for coaction with the cam bar, cam and lever mechanism on the lower frame to actuate the cam bar for downward camming movement of the upper frame, releasable means to fix the cam bar at various points of its movement whereby variable roll pressure may be set at the option of the operator, and legible indicia actuated by rotational movement of the cam bar to visually indicate initial roll setting pressure.

4. In a wringer, a lower frame, a lower roll mounted in the lower frame, an upper frame, an upper roll resiliently mounted to the upper frame to urge the roll downward into pressure relationship with the lower roll, an unstable rotatable cam bar mounted in the upper frame, hook members on the lower frame for coaction with the cam bar, cam and lever mechanism on the lower frame to actuate the cam bar for downward camming movement of the upper frame, releasable means to fix the cam bar at various points of its movement whereby variable roll pressures may be set at the option of the operator, legible indicia actuated by rotational movement of the cam bar to visually indicate initial roll pressure setting and means to release said cam bar for reverse movement and release of roll pressure.

5. In a wringer, cooperative frame members, a pair of cooperative rolls, resilient means urging said rolls into pressure engagement with one another, hook members on the lower frame, an unstable rotatable cam bar manually operable in coaction with the hook members to connect the frame members and force the rolls into variable pressure engagement, and releasable means to fix the cam bar at various positions to set the rolls in various pressure relationships.

6. In a wringer, cooperative frame members, a pair of cooperative rolls, resilient means urging said rolls into pressure engagement with one another, hook members on the lower frame, an unstable rotatable cam bar manally operable in coaction with the hook members to connect the frame members and force the rolls into variable pressure engagement, legible indicia actuated by the movement of the cam bar to visually initial roll pressure setting, means for holding the rolls in pressure engagement with each other, and means to release said cam bar for reverse movement and release of roll pressure.

HENRY W. ALTORFER.